United States Patent
George et al.

(10) Patent No.: US 9,969,319 B2
(45) Date of Patent: May 15, 2018

(54) METHOD AND SYSTEM FOR AUTOMATIC CONTROL OF A HEADLIGHT OF A VEHICLE

(71) Applicant: Wipro Limited, Bangalore (IN)

(72) Inventors: Tomson Ganapathiplackal George, Paika (IN); Ashok Chandran, Thekkekara (IN)

(73) Assignee: Wipro Limited, Bangalore (IN)

( * ) Notice: Subject to any disclaimer, the term of this patent is extended or adjusted under 35 U.S.C. 154(b) by 0 days. days.

(21) Appl. No.: 15/359,526

(22) Filed: Nov. 22, 2016

(65) Prior Publication Data
US 2018/0093604 A1    Apr. 5, 2018

(30) Foreign Application Priority Data
Sep. 30, 2016 (IN) .............................. 201641033448

(51) Int. Cl.
*B60R 22/00* (2006.01)
*B60Q 1/08* (2006.01)
*B60Q 1/00* (2006.01)

(52) U.S. Cl.
CPC ........... *B60Q 1/085* (2013.01); *B60Q 1/0023* (2013.01); *B60Q 2300/41* (2013.01)

(58) Field of Classification Search
CPC ... B60Q 1/085; B60Q 1/0023; B60Q 2300/41
USPC .......................................... 701/49, 36, 29.1
See application file for complete search history.

(56) References Cited

U.S. PATENT DOCUMENTS 6,817,740 B2    11/2004   Kobayashi et al.
2009/0086497 A1*  4/2009   Kamioka ............... B60Q 1/085
                                                   362/466

FOREIGN PATENT DOCUMENTS

| CN | 102325406 A  | 1/2012  |
| CN | 102358230 A  | 2/2012  |
| CN | 103692955 A  | 4/2014  |
| KR | 2005000365 A | 12/2005 |
| WO | 2010083802 A1 | 7/2010 |

* cited by examiner

*Primary Examiner* — Gertrude Arthur Jeanglaude
(74) *Attorney, Agent, or Firm* — LeClairRyan PLLC

(57) ABSTRACT

The present disclosure relates to a method and system for automatic control of a headlight of a vehicle by a mobile computing device. The mobile computing device receives vehicle related information and external information associated with the mobile computing device, where the mobile computing device is associated with an operator of the vehicle and is communicatively coupled with vehicle. Further, the mobile computing device computes an intensity and an orientation of a headlight of the vehicle based on one or more vehicle lighting patterns, where said vehicle lighting patterns are generated based on behavior of the headlight of the vehicle, which is operated by the operator, for a predefined duration in association with the vehicle related information and external information and provides computed intensity and orientation of the headlight of the vehicle to a lighting control module of the vehicle for automatic control of the headlight of the vehicle.

12 Claims, 6 Drawing Sheets

METHOD AND SYSTEM FOR AUTOMATIC CONTROL OF A HEADLIGHT OF A VEHICLE

This application claims the benefit of Indian Patent Application Serial No. 201641033448 filed Sep. 30, 2016 which is hereby incorporated by reference in its entirety.

FIELD

The present subject matter is related in general to the field of automatic light control system, more particularly, but not exclusively to a method and system for automatic control of a headlight of a vehicle.

BACKGROUND

In the recent years, automobile industries have grown exponentially with modernized and advanced features in the automobile. A lot of research is being carried out on different aspects and categories of the vehicle in order to provide safety and comfort to the users. Among the varied advanced categories, Automatic Light Control system (ACL) is a standard feature in most of the automobiles today. The automatic light control system eliminates the need for the users to manually operate the headlight such as, switch ON or OFF etc., in most of the driving situation.

Today, with increasing number of vehicles on road, the automobile manufacturers are focussing on generating extra safety components and electronic controls to attach with automobile in order to give the users safety. Generally, driving at night is very cumbersome due to the glaring light problems and non-dipping of headlights which often causes inconvenience to the users. Therefore, in order to avoid such problems, control of the headlights of the vehicle can be automated whenever required.

In the existing scenario and with the existing technology, there is no option for a personalized automation of headlights of the vehicle for the users. Also, in the existing technique, the requirements set by a user for controlling the headlight of a vehicle is restricted to that particular vehicle and cannot be used in any other vehicle. For instance, a user regularly travelling on a particular location may have had and used a preferred pattern of lighting, which may be of his preference and may like to use the same pattern again, when travelling next time on the same road of the location. The user traveling in a particular location has regularly set the headlight of the vehicle according to his preference. There is no option, through which the same control can be used in another vehicle, if the user wishes to change the vehicle. Therefore, there is a need for a personalized user system which automatically controls the headlight of the vehicle and also can make use of the same lighting pattern while driving a different vehicle.

SUMMARY

In an embodiment, the present disclosure relates to a method for automatic control of a headlight of a vehicle. The method may comprise receiving vehicle related information from a plurality of sensors and external information from a plurality of external sources associated with the mobile computing device. The mobile computing device may be associated with an operator of a vehicle and may be communicatively coupled with the vehicle. The method may comprise computing an intensity and an orientation of a headlight of the vehicle based on one or more vehicle lighting patterns. The one or more vehicle lighting patterns may be generated based on behavior of the headlight of the vehicle, which may be operated by the operator, for a pre-defined duration in association with the vehicle related information and the external information. The method may comprise providing the computed intensity and the orientation of the headlight of the vehicle to a lighting control module of the vehicle for automatic control of the headlight of the vehicle.

In an embodiment, the present disclosure relates to a mobile computing device for automatic control of a headlight of a vehicle. The mobile computing device may comprise a processor and a memory communicatively coupled to the processor, wherein the memory stores processor executable instructions, which, on execution, may cause the mobile computing device to receive vehicle related information from a plurality of sensors and external information from a plurality of external sources associated with the mobile computing device. The mobile computing device may be associated with an operator of a vehicle and may be communicatively coupled with the vehicle. The mobile computing device may compute an intensity and an orientation of a headlight of the vehicle based on one or more vehicle lighting patterns. The one or more vehicle lighting patterns may be generated based on behavior of the headlight of the vehicle, which may be operated by the operator, for a pre-defined duration in association with the vehicle related information and the external information. The mobile computing device may provide the computed intensity and the orientation of the headlight of the vehicle to a lighting control module of the vehicle for automatic control of the headlight of the vehicle.

In an embodiment, the present disclosure relates to a non-transitory computer readable medium including instructions stored thereon that when processed by at least one processor may cause a mobile computing device to receive vehicle related information from a plurality of sensors and external information from a plurality of external sources associated with the mobile computing device, wherein the mobile computing device may be associated with an operator of a vehicle and may be communicatively coupled with the vehicle, compute an intensity and an orientation of a headlight of the vehicle based on one or more vehicle lighting patterns, wherein said one or more vehicle lighting patterns may be generated based on behavior of the headlight of the vehicle, which may be operated by the operator, for a pre-defined duration in association with the vehicle related information and the external information and may provide the computed intensity and the orientation of the headlight of the vehicle to a lighting control module of the vehicle for automatic control of the headlight of the vehicle.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
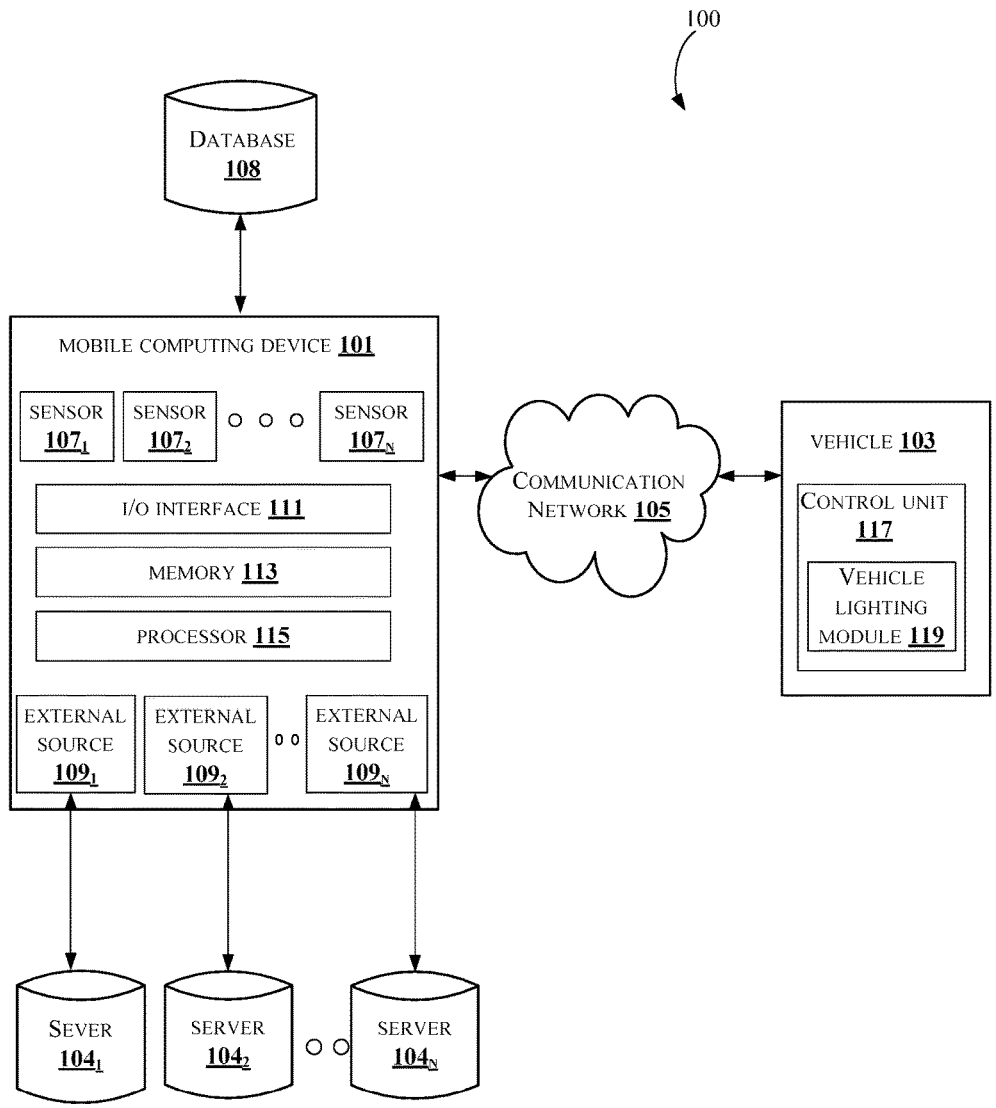
FIG. 1 illustrates an exemplary environment for automatic control of a headlight of a vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for automatic control of a headlight of a vehicle. The present disclosure may provide a mobile computing device which may automate the control of the headlight of the vehicle. In an embodiment, a user may authenticate the mobile computing device associated with the user with a vehicle lighting module of the vehicle. The mobile computing device may be the prime computing device and may be independent of any vehicle to control the vehicle headlight under multiple circumstances. In an embodiment, the user may be provided with a choice of selecting either automatic or a manual control of headlight. Once an automatic option is selected by the user, the mobile computing device may receive vehicle related information from various sensors configured in the mobile computing device and external information from the external sources. The mobile computing device may compute an intensity and an orientation of the headlight of the vehicle based on one or more vehicle lighting patterns. The one or more vehicle lighting patterns may be generated by analysing behavior of the headlight operated by the user for a period of time. The computed intensity and the orientation may be further provided to a control unit of the vehicle for automation.

FIG. 1 illustrates an exemplary environment for automatic control of a headlight of a vehicle in accordance with some embodiments of the present disclosure.

As shown in FIG. 1, the environment 100 comprises a mobile computing device 101 and a vehicle 103 communicatively coupled through a communication network 105. The mobile computing device 101 comprises a sensor $107_1$, sensor $107_2$ . . . sensor $107_N$ (collectively referred as plurality of sensors 107) and external source $109_1$, external source $109_2$ . . . external source $109_N$ (collectively referred as plurality of external sources 109). The external source $109_1$, external source $109_2$ . . . external source $109_N$ are connected to their respective servers, server $104_1$, server $104_2$ . . . server $104_N$ (collectively referred as plurality of servers 104). The mobile computing device 101 may also be connected to a database 108. In an embodiment, the mobile computing device 101 may include, but are not limited to, a notebook, a smartphone, a tablet and any other computing devices. In an embodiment, the user may be provided with an option to select automatic or manual control of the headlight of the vehicle. The user may prefer automatic control of the headlight of the vehicle for the location where the user travels regularly. In order to automate the headlight of the vehicle 103, the mobile computing device 101 may initially connect with the vehicle lighting module 119. In order to automate control of the headlight, the mobile computing device 101 may receive vehicle related information from the plurality of sensors 107 which are configured on the mobile computing device 101 and external information from a plurality of external sources 109. In an embodiment, the plurality of sensors 107 may include, but are not limited to, camera, GPS sensors, gyroscope and accelerometer. The vehicle related information comprises trajectory data of the vehicle, location data of the vehicle, geographic data around location of the vehicle, data on presence of movable and non-movable objects in front of the vehicle and preferences associated with the operator of the vehicle. In an embodiment, the plurality of external sources 109 may include, but not limited to, media sources, weather service providers, location protocol applications, and traffic rules providers. The external information comprises environmental data around the vehicle, traffic data associated with the location of the vehicle and vehicle lighting protocol around the location of the vehicle. The plurality of external sources 109 connect with the respective server for acquiring the external information. Further, once the vehicle related information and the external information are received, the mobile computing device 101 may compute the intensity and the orientation of the headlight of the vehicle based on one or more vehicle lighting patterns and received information. In an embodiment, over a period of time, the operation of the headlight of the vehicle operated by the user for one or more locations is monitored. Based on the monitored operation of the headlight operated by the user, the one or more vehicle lighting patterns may be generated and stored in the database 108. Post the generation of the one or more vehicle lighting patterns, whenever the user selects automation mode for the headlights of the vehicle 103, the mobile computing device 101 may receive the vehicle related information and external information in real time. The intensity and the orientation of the headlight of the vehicle 103 are then computed based on the one or more vehicle lighting patterns stored in the database 108 and received information. The computed intensity and the orientation are provided to the control unit 117 of the vehicle 103. In an embodiment, the control unit 117 of the vehicle 103 may be an embedded system which controls one or more units of the vehicle 103. In an embodiment, the control unit 117 may control and connect with other components of the vehicle 103. The control unit 117 of the vehicle 103 communicates the computed intensity and the orientation to the vehicle lighting module 119 for performing the operation automatically. In an embodiment, the vehicle lighting module 119 of the vehicle 103 may be a module which controls and performs the functions of the headlight of the vehicle 103.

The mobile computing device 101 comprises an I/O Interface 111, a memory 113 and a processor 115. The I/O interface 111 is configured to receive vehicle related information from plurality of sensors 107 configured in the mobile computing device 101. The I/O interface 111 also receives a plurality of external information from a plurality of external sources 109.

The received information from the I/O interface 111 is stored in the memory 113. The memory 113 is communicatively coupled to the processor 115 of the mobile computing device 101. The memory 113 also stores processor instructions which cause the processor 115 to execute the instruction for automatic control of headlight of the vehicle 103.

Figure 2A:
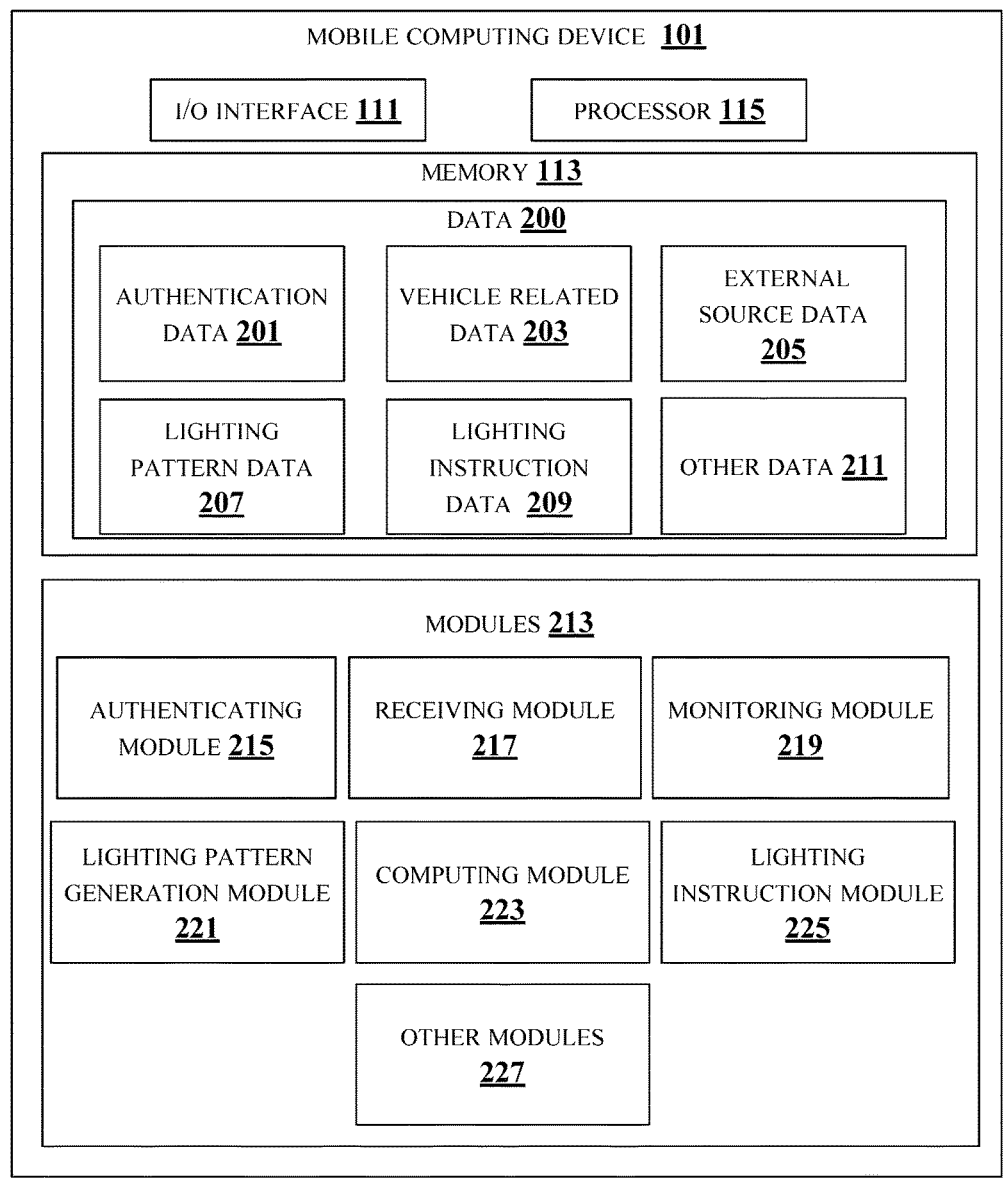
FIG. 2a shows a detailed block diagram of a mobile computing device in accordance with some embodiments of the present disclosure.

FIG. 2a shows a detailed block diagram of a mobile computing device in accordance with some embodiments of the present disclosure.

Data 200 and one or more modules 213 of the mobile computing device 101 are described herein in detail. In an embodiment, the data 200 comprises authentication data 201, vehicle related data 203, external source data 205, lighting pattern data 207, lighting instruction data 209 and other data 211.

The authentication data 201 comprises information relating to authentication between a vehicle 103 and a mobile computing device 101. The authentication data 201 helps to connect the vehicle 103 operated by the user with the mobile computing device 101 of the user.

The vehicle related data 203 may comprise information related to the vehicle 103 with respect to the location of the vehicle and current time based on time zone of the user of the vehicle. The vehicle related data 203 comprises trajectory data of the vehicle 103, location data of the vehicle, geographic data around location of the vehicle, data on presence of movable and non-movable objects in front of the vehicle and preferences associated with the operator of the vehicle. The vehicle related data 203 may be received from the plurality of sensors 107 configured in the mobile computing device 101.

The external source data 205 may comprise external information for automating the headlight of the vehicle 103. The external source data 205 comprises environmental data around the vehicle, traffic data associated with the location of the vehicle and vehicle lighting protocol around the location of the vehicle.

The lighting pattern data 207 may comprise information on the one or more vehicle lighting patterns identified for the user. The one or more vehicle lighting patterns may be stored in the database 108. The one or more vehicle lighting patterns may be determined based on the behavior of the headlight of the vehicle 101 monitored over a period of time.

The lighting instruction data 209 may comprise information about computed intensity and orientation of the headlight of the vehicle for the user. The intensity and the orientation of the headlight may be computed based on the vehicle related data 203 and external source data 205 and lighting pattern data 207. The lighting instruction data 209 may be provided to the control unit 117 of the vehicle 103 for execution.

The other data 211 may store data, including temporary data and temporary files, generated by modules for performing the various functions of the mobile computing device 101.

In an embodiment, the data 200 in the memory 113 are processed by the one or more modules 213 of the mobile computing device 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 213 may include, but is not limited to, authentication module 215, receiving module 217, monitoring module 219, lighting pattern generation module 221, computing module 223 and lighting instruction module 225. The one or more modules 213 may also comprise other modules 227 to perform various miscellaneous functionalities of the mobile computing module 101. It will be appreciated that such aforementioned modules may be represented as a single module or a combination of different modules.

The authentication module 215 may authenticate the mobile computing device 101 with the vehicle lighting module 119 of the vehicle 103. In an embodiment, the user authenticates the mobile computing device 101 with the vehicle used for driving. In a non-limiting embodiment, the authentication may be performed using a unique pin number to get paired with the vehicle lighting module 119. Further, authenticating the mobile computing device 101 with the vehicle 103 enables the users to use automatic lighting mode for the headlight of the vehicle 103.

The receiving module 217 receives vehicle related data 203 and external source data 205 associated with the vehicle 103 for the user. The vehicle related data 203 may be received from the plurality of sensors 107 placed in the mobile computing device 101. Further, the external source data 205 may be received from the plurality of external sources 109. In an embodiment, the external source data 205 may be collected by the mobile computing device 101 through various online services and plurality of external sources 109. Each of the external sources 109 may be in turn connected with a respective server 104 for fetching information on particular services.

The monitoring module 219 may monitor the behavior of the headlight of the vehicle 103 operated by the user traveling in a particular route for a pre-defined duration. The monitoring may be performed based on the actions taken by the user in operating the headlight of the vehicle 103 in association with the vehicle related data 203 and the external source data 205. In an embodiment, the monitoring may be performed for every location used by the user regularly and for which the user requires automatic control of the headlight.

The lighting pattern generation module 221 may generate the one or more vehicle lighting pattern for a user operating the vehicle 103 for a particular location. In an embodiment, the one or more vehicle lighting patterns are based on the monitored behavior of the headlight operated by the users in the particular location for a pre-defined duration and the vehicle related data 203 and the external source data 205 associated with the vehicle 103 in real time. For instance, a user driving at a particular location may use one or more vehicle lighting pattern.

The computing module 223 computes the intensity and the orientation of the headlight of the vehicle 103 based on the one or more vehicle lighting patterns generated and the vehicle related data 203 and external source data 205 received in real time. Table 1 below shows the computed intensity for a particular location based on the vehicle related information and the external source information.

TABLE 1

| Scenarios | Sensors/external based information | Intensity control |
|---|---|---|
| City area where dim light is mandated in specific time. | Traffic rule service | Change the headlight intensity to specific predefined value. |
| Approaching a curve. | GPS, Accelerometer | Change the headlight intensity back/fort low/high value. |
| Obstacle in front of the vehicle. | Camera, Accelerometer | Change the headlight intensity to highlight near vehicle area based on predefined value Warning to the driver in display. |
| Taking a curve. | Accelerometer, Gyroscope | Change the headlight intensity to highlight near vehicle area visible |
| Driving under fog. | Weather service | Change the headlight intensity to visible under fog/turn on fog lamp. |
| Vehicle approaching current vehicle. | Camera, Accelerometer | Change the vehicle intensity to permissible limit based on the distance. |

The lighting instruction module 225 may provide the intensity and the orientation computed to the control unit 117 of the vehicle 103. In an embodiment, standard protocols such as, ZigBee, Bluetooth etc., may be used for providing instructions to the control unit 117 of the vehicle 103. Upon receiving the computed intensity and the orientation of the headlight of the vehicle 103, the control unit 117 provides the same to the vehicle lighting module 119. The vehicle lighting module 119 may trigger the headlight of the vehicle based on the received instructions.

Figure 2B:
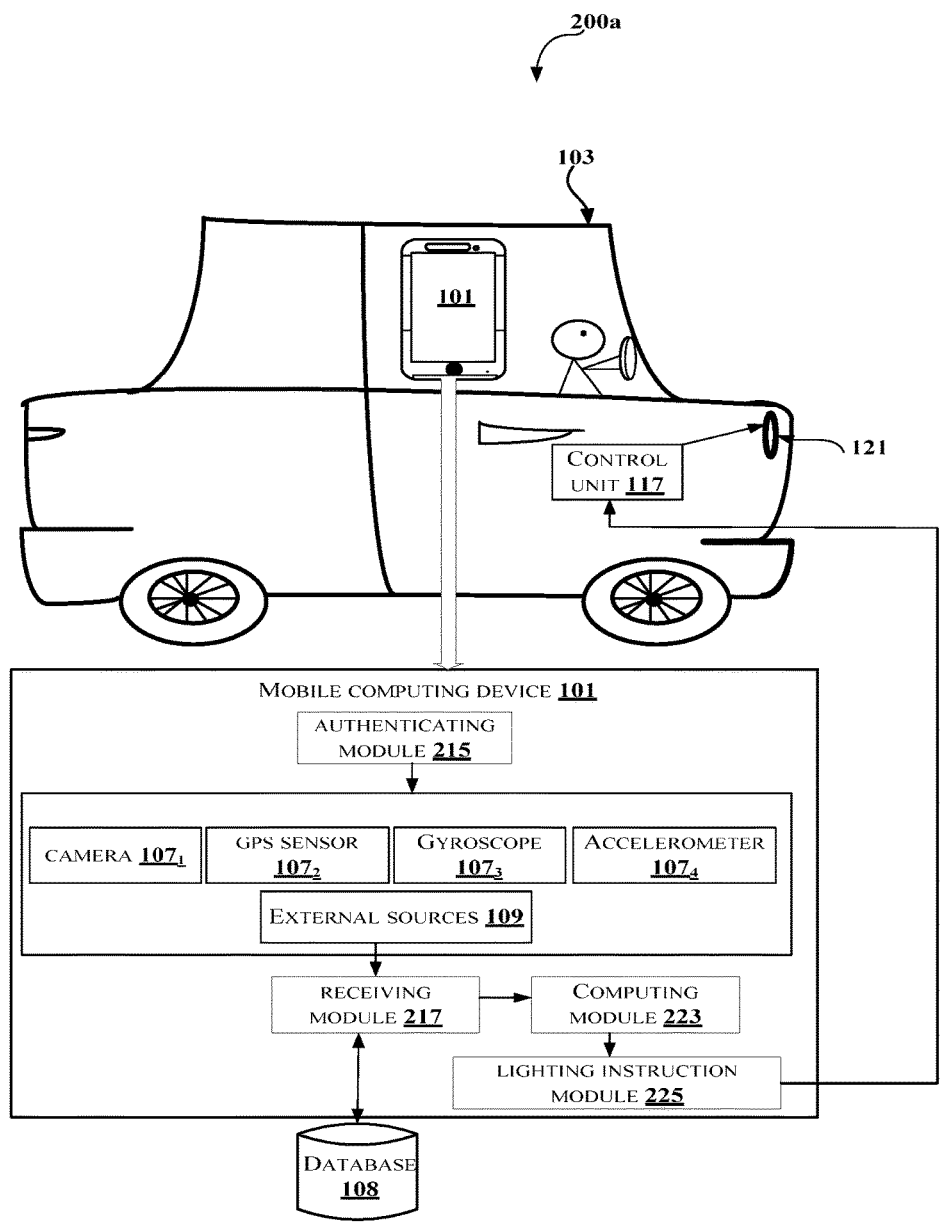
FIG. 2b shows an exemplary environment illustrating data flow between different modules of mobile computing device in accordance with some embodiment of the present disclosure.

FIG. 2b shows an exemplary environment illustrating data flow between different modules of mobile computing device in accordance with some embodiment of the present disclosure. As shown in FIG. 2b, a mobile computing device 101 (here a mobile phone) placed in the vehicle 103 (car) comprises plurality of sensors 107. The plurality of sensors 107 may include, but are not limited to, a camera $107_1$, a GPS sensor $107_2$, a gyroscope $107_3$ and an accelerometer $107_4$. A person skilled in the art would understand that any other type of sensors can be used with the present disclosure. As an example, the camera $107_1$ and the accelerometer $107_4$ in conjunction with the GPS sensor $107_2$ may be employed to control switching between high intensity light and low intensity light automatically whenever an oncoming vehicle is detected. The intensity may be controlled based on a distance of the oncoming vehicle. The camera $107_1$ in the mobile computing 101 may also scan a pre-defined area in front of the vehicle, such as, detecting a person or an object within the pre-defined area in front of the vehicle 103 and adjusting the headlight intensity to give a clear view of the area in night driving. In an embodiment, the pre-defined area may include 50 square feet area in front of the vehicle 103. In an embodiment, the external information such as, environment details from an external source service may be collected by the mobile computing device 101 in conjunction with the GPS sensor $107_2$ to control automatically the fog lamp of the vehicle 103. Further, the GPS sensor $107_2$ in conjunction with a location source application such as, maps, may locate the position of the vehicle 103 in real time. The located position of the vehicle 103 helps in enabling the vehicle 103 to switch between low beam intensity and high beam intensity automatically to give indication to oncoming vehicles. Also, in an embodiment, the GPS sensors $107_2$ based on the location source service along with time information switches to low intensity mode automatically when the vehicle 103 enters an area where low intensity light mode is enforced by law. For example, a city where all the vehicles should use low beam intensity in the night between certain time periods. (7.00 PM-9.00 PM). Further, information from the plurality of sensors 107 of the mobile computing device 101 may be used to calculate a turning angle the vehicle 103 may be taking, which can be used to control headlight orientation of the vehicle 103 taking curves. In an embodiment, modularization of the headlight control makes automatic lighting personalized as the lighting needs vary from person to person. Further, the information from the plurality of sensors 107 and the external sources 109 may further be received and processed by the modules of the mobile computing device 101 as shown in FIG. 2b. The lighting instruction module 225 provides the computed intensity and the orientation to the control unit 117 of the vehicle 103. The control unit 117 may then instruct the vehicle lighting module to trigger changes in headlight based on the instruction received as shown in FIG. 2b.

Figure 3:
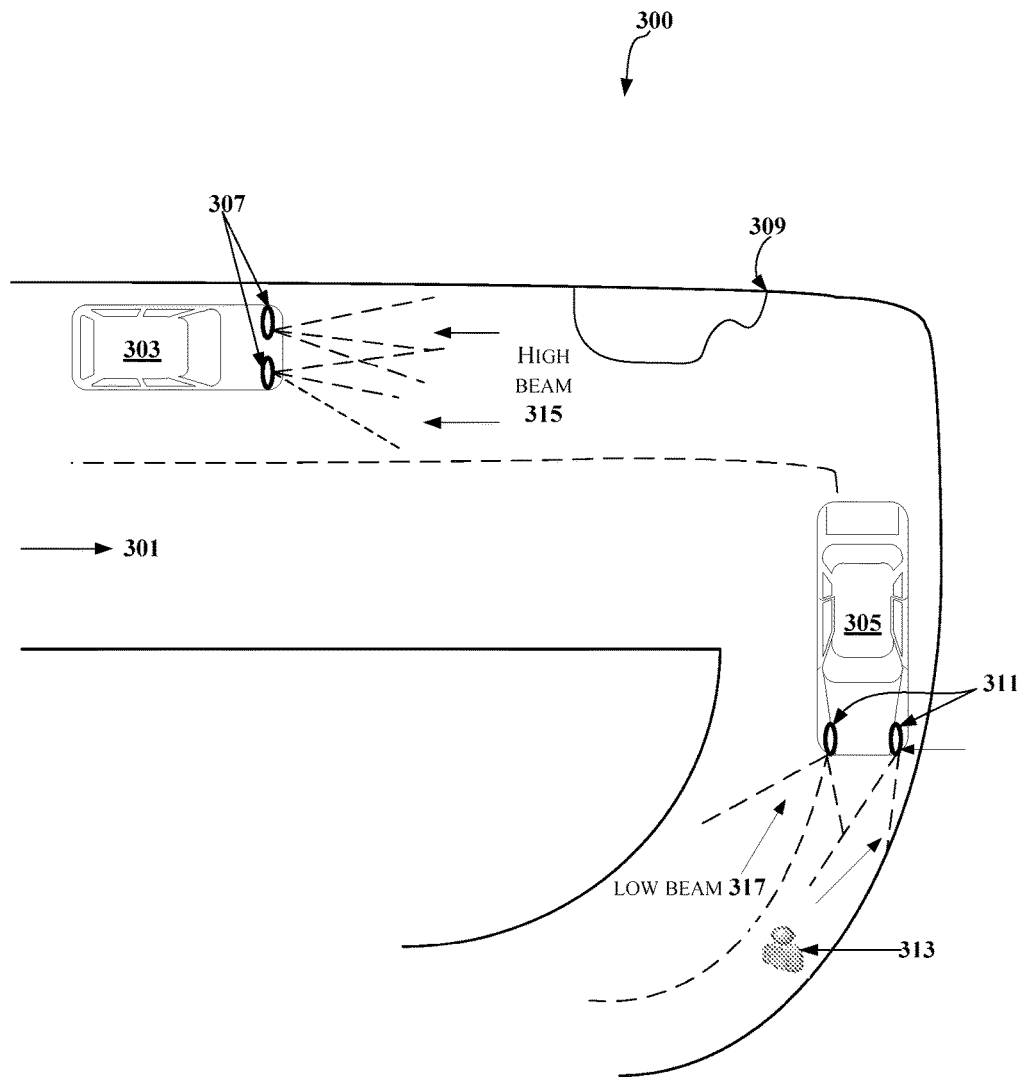
FIG. 3 shows an exemplary representation of the vehicle in different scenarios in accordance with some embodiment of the present disclosure.

FIG. 3 shows an exemplary representation of the vehicle in different scenarios in accordance with some embodiment of the present disclosure.

As shown in FIG. 3, the environment 300 illustrates two scenarios where vehicle 303 and vehicle 305 are traveling on a road 301 of a location during night time in an exemplary embodiment of the present disclosure. The environment 300 illustrates the scenarios, where users of both the vehicles 303 and vehicle 305 have enforced automatic control of the headlight. Initially, the mobile computing devices (not shown in fig) of the users associated with vehicle 303 and vehicle 305 respectively are connected with a corresponding vehicle lighting module (not shown in fig). As user of the vehicle 303 and user of the vehicle 305 may be frequent travelers on the road 301 of the location, the one or more vehicle lighting patterns for both the users may be calculated and stored in their respective mobile computing devices. In the first scenario, as shown in FIG. 3, the headlights 307 of the vehicle 303 emit high beam intensity on determining an obstacle 309 on the road 301. The high beam intensity is automatically switched ON based on the one or more vehicle lighting patterns of the user associated with vehicle 303. The high beam intensity may also be switched ON based on the vehicle related information received from the plurality of sensors (not shown in fig) placed in the mobile computing device of user of vehicle 303 and external information from external sources associated with the mobile computing device of user of vehicle 303. Further, in the second scenario, the headlights 311 of the vehicle 305 emit low beam intensity on encountering a person 313 in front of the vehicle 305 automatically. In both the scenarios, the headlights of the vehicles emit light automatically based on their one or more vehicle lighting patterns generated over the time and the vehicle related information and the external information received in real-time.

Figure 4:
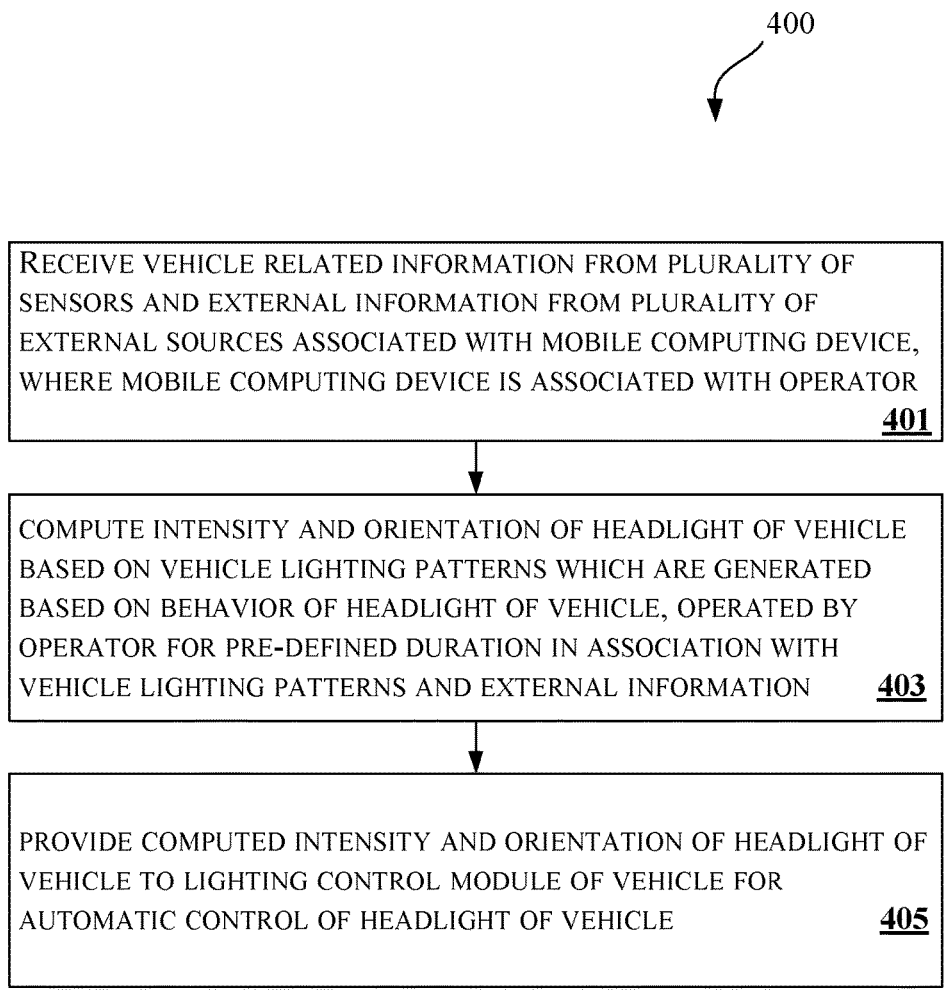
FIG. 4 illustrates a flowchart showing a method for automatic control of a headlight of a vehicle in accordance with some embodiments of present disclosure.

FIG. 4 illustrates a flowchart showing a method for automatic control of a headlight of a vehicle in accordance with some embodiments of present disclosure.

As illustrated in FIG. 4, the method 400 comprises one or more blocks for automatic control of a headlight of a vehicle. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the mobile computing device 101 may receive vehicle related information from the plurality of sensors 107 and the external information from the plurality of external sources 109 associated with the mobile computing device 101. The mobile computing device 101 may be associated with the operator of the vehicle 103 and may be communicatively coupled with the vehicle 103.

At block 403, the mobile computing device 101 may compute the intensity and the orientation of the headlight of the vehicle based on the one or more vehicle lighting patterns. The one or more vehicle lighting patterns may be generated based on behavior of the headlight of the vehicle, which may be operated by the operator, for the pre-defined duration in association with the vehicle related information and the external information.

At block 405, the mobile computing device 101 provides the computed intensity and orientation of the headlight of the vehicle to the lighting control module 119 of the vehicle for automatic control of the headlight of the vehicle.

Computing System

Figure 5:
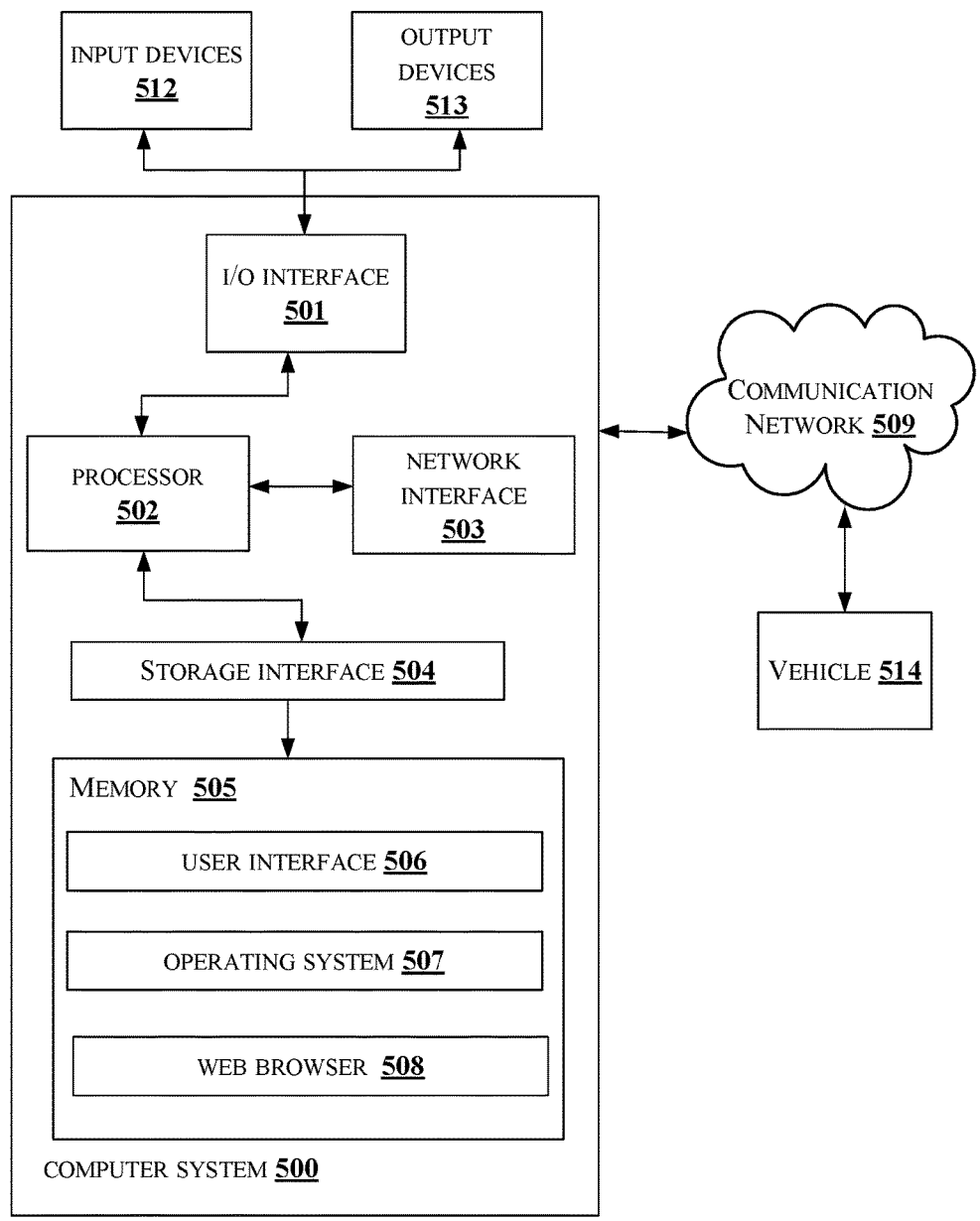
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the mobile computing device 101. The computer system 500 may comprise a central processing unit ("CPU" or "processor") 502. The processor 502 may comprise at least one data processor for automatic control of a headlight of a vehicle. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a mobile computing device 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a vehicle 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as, Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as, AJAX, DHTML, Adobe Flash, JavaScript, Java, Application Programming Interfaces (APIs), etc. In some embodiments, the computer system 500 may implement a mail server stored program component. The mail server may be an Internet mail server such as, Microsoft Exchange, or the like. The mail server may utilize facilities such as, ASP, ActiveX, ANSI C++/C#, Microsoft .NET, CGI scripts, Java, JavaScript, PERL, PHP, Python, WebObjects, etc. The mail server may utilize communication protocols such as, Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides automatic control of the vehicle headlight using a mobile computing device.

An embodiment of the present disclosure provides plurality of sensors used for lighting control mechanism within the mobile computing device which enables the users to use the personalized lighting pattern in any another vehicle.

The present disclosure automates the control of the headlight of the vehicle based on the user preferences.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for automatic control of a headlight of a vehicle, the method comprising:
   receiving, by a mobile computing device, vehicle related information from a plurality of sensors and external information from a plurality of external sources associated with the mobile computing device, wherein the mobile computing device is associated with an operator of a vehicle and is communicatively coupled with the vehicle;
   computing, by the mobile computing device, an intensity and an orientation of a headlight of the vehicle based on one or more vehicle lighting patterns, wherein said one or more vehicle lighting patterns are generated based on behavior of the headlight of the vehicle, which is operated by the operator, for a pre-defined duration in association with the vehicle related information and the external information, and wherein the one or more vehicle lighting patterns comprise usage of a high beam intensity light of the headlight, usage of a low beam intensity light of the headlight, and turning ON of a fog lamp; and
   providing, by the mobile computing device, the computed intensity and the orientation of the headlight of the vehicle to a lighting control module of the vehicle for automatic control of the headlight of the vehicle.

2. The method as claimed in claim 1, wherein the vehicle related information comprises trajectory data of the vehicle, location data of the vehicle, geographic data around location of the vehicle, data on presence of movable and non-movable objects in front of the vehicle and preferences associated with the operator of the vehicle.

3. The method as claimed in claim 1, wherein the external information comprises environmental data around the vehicle, traffic data associated with the location of the vehicle and vehicle lighting protocol around the location of the vehicle.

4. The method as claimed in claim 1 further comprising authenticating the mobile computing device with the lighting control module of the vehicle.

5. A mobile computing device for automatic control of a headlight of a vehicle, comprising:
   a processor; and
   a memory communicatively coupled to the processor, wherein the memory stores processor instructions, which, on execution, causes the processor to:
      receive vehicle related information from a plurality of sensors and external information from a plurality of external sources associated with the mobile computing device, wherein the mobile computing device is associated with an operator of a vehicle and is communicatively coupled with the vehicle;
      compute an intensity and an orientation of a headlight of the vehicle based on one or more vehicle lighting patterns, wherein said one or more vehicle lighting patterns are generated based on behavior of the headlight of the vehicle, which is operated by the operator, for a pre-defined duration in association with the vehicle related information and the external information, and wherein the one or more vehicle lighting patterns comprise usage of a high beam intensity light of the headlight, usage of a low beam intensity light of the headlight, and turning ON of a fog lamp; and
      provide the computed intensity and the orientation of the headlight of the vehicle to a lighting control module of the vehicle for automatic control of the headlight of the vehicle.

6. The mobile computing device as claimed in claim 5, wherein the vehicle related information comprises trajectory data of the vehicle, location data of the vehicle, geographic data around location of the vehicle, data on presence of movable and non-movable objects in front of the vehicle and preferences associated with the operator of the vehicle.

7. The mobile computing device as claimed in claim 5, wherein the external information comprises environmental data around the vehicle, traffic data associated with the location of the vehicle and vehicle lighting protocol around the location of the vehicle.

8. The mobile computing device as claimed in claim 5, wherein the processor authenticates the mobile computing device with the lighting control module of the vehicle.

9. A non-transitory computer readable medium including instruction stored thereon that when processed by at least one processor cause a mobile computing device to perform operation comprising:

receiving vehicle related information from a plurality of sensors and external information from a plurality of external sources associated with the mobile computing device, wherein the mobile computing device is associated with an operator of a vehicle and is communicatively coupled with the vehicle;

computing an intensity and an orientation of a headlight of the vehicle based on one or more vehicle lighting patterns, wherein said one or more vehicle lighting patterns are generated based on behavior of the headlight of the vehicle, which is operated by the operator, for a pre-defined duration in association with the vehicle related information and the external information, and wherein the one or more vehicle lighting patterns comprise usage of a high beam intensity light of the headlight, usage of a low beam intensity light of the headlight, and turning ON of a fog lamp; and providing the computed intensity and the orientation of the headlight of the vehicle to a lighting control module of the vehicle for automatic control of the headlight of the vehicle.

10. The medium as claimed in claim 9, wherein the vehicle related information comprises trajectory data of the vehicle, location data of the vehicle, geographic data around location of the vehicle, data on presence of movable and non-movable objects in front of the vehicle and preferences associated with the operator of the vehicle.

11. The medium as claimed in claim 9, wherein the external information comprises environmental data around the vehicle, traffic data associated with the location of the vehicle and vehicle lighting protocol around the location of the vehicle.

12. The medium as claimed in claim 9, wherein the instruction causes the processor to authenticate the mobile computing device with the lighting control module of the vehicle.

* * * * *